W. NAUMANN.
SYSTEM OF MOTOR CONTROL.
APPLICATION FILED JUNE 10, 1908.

1,071,778.

Patented Sept. 2, 1913.

WITNESSES:
Benjamin B. Hull
Helen Orford

INVENTOR
WILHELM NAUMANN.
BY Albert G. Davis
ATTY.

UNITED STATES PATENT OFFICE.

WILHELM NAUMANN, OF BERLIN, GERMANY, ASSIGNOR TO GENERAL ELECTRIC COMPANY, A CORPORATION OF NEW YORK.

SYSTEM OF MOTOR CONTROL.

1,071,778.　　　　Specification of Letters Patent.　　Patented Sept. 2, 1913.

Application filed June 10, 1908. Serial No. 437,688.

*To all whom it may concern:*

Be it known that I, WILHELM NAUMANN, a subject of the King of Prussia, residing at Berlin, Germany, have invented certain new and useful Improvements in Systems of Motor Control, of which the following is a specification.

My invention relates to the control of electric motors for driving hoists and similar apparatus. For this kind of work, three sets of connections are frequently desirable,—first for operation as a motor for hoisting; second for operation as a motor in lowering a light load; and third, for operation as a braking generator for lowering heavy loads. For hoisting, a series characteristic is desirable, so that it is customary to employ a series-wound or compound-wound motor. If the connections for lowering a light load are made in the usual way, by reversing the armature and connecting it in series with the field winding, there is danger of too great a speed, since the field is weakened more and more as the armature speed increases.

The objects of my invention are, to produce a novel control system in which power may be applied to the motor for lowering the load without operating the motor at too great a speed, to connect the armature and field winding of the motor in a closed circuit during lowering so that in case the power fails a dynamic brake will be applied to the motor, and to connect the motor in a local or dynamic braking circuit when the controller is in the off-position. To this end, my invention consists in certain novel features whereby these objects may be attained.

My invention will best be understood by reference to the accompanying drawings, in which—

Figure 1:
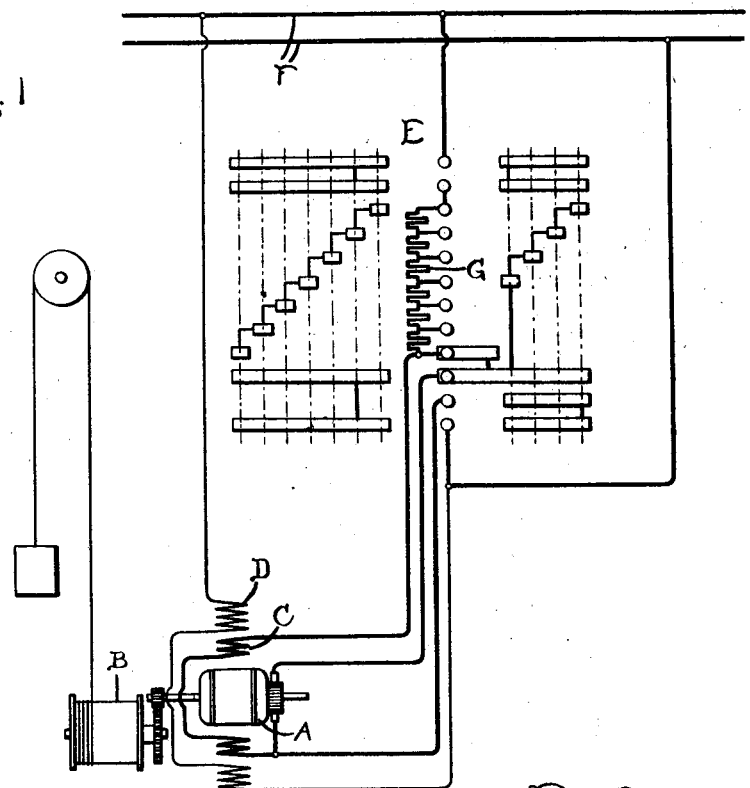
Figure 2:
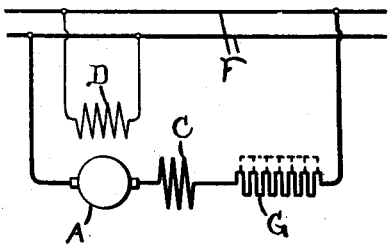
Figure 3:
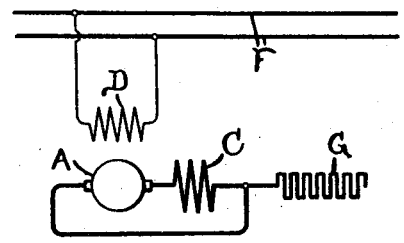
Figure 4:
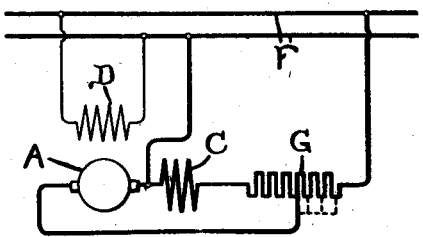

Figure 1 shows diagrammatically an electric motor with its control system arranged in accordance with my invention; and Figs. 2, 3 and 4 are diagrams of connections established by the control system of Fig. 1.

In Fig. 1, A represents the armature of a motor which I have shown diagrammatically, geared to a hoisting drum B. C represents the main field of the motor, which, for hoisting, is connected in series with the motor-armature. The motor may also be provided with a shunt-field D, thereby making the motor compound-wound. This shunt-field is not, however, essential. E represents a reversing switch for connecting the motor to the line F, for either direction of rotation, and also serving in its off position to disconnect the motor from the line and connect it in short-circuit for braking. G represents a resistance for controlling the current in the motor-circuit. The switch E is shown diagrammatically with its contacts developed in a plane surface. When the switch is moved so as to bring the left hand movable contacts into engagement, a circuit is closed from the upper line-wire F through resistance G, field winding C armature A, to the lower line wire F, which connections are shown in Fig. 2. The shunt winding D, if employed, is connected directly across the line. The motor thus starts as a compound or series wound motor, according, as the field-winding D is or is not employed. A further movement of switch E in the same direction cuts resistance G out of circuit step-by-step. These hoisting connections are those ordinarily employed. When the switch E is returned to off-position, as shown, the motor-armature is disconnected from the line and is connected in a local or dynamic braking circuit with the main field winding C. The auxiliary shunt winding D may or may not be left connected to the line. This connection is shown in Fig. 3, and is that frequently employed for braking an electric hoist.

When the switch E is moved to bring the right hand movable contacts into engagement with the contact fingers, connections are established for motor-operation for lowering a light load. In this position of the switch E, the lower line-wire F is connected to the junction of armature winding and field winding C, while the armature-terminal that in hoisting was connected to this line-wire is now connected to an intermediate point on resistance G as is shown in Fig. 4. This places the armature winding and field winding C in parallel relation, and with the direction of current in the armature reversed. The motor consequently operates to lower the load, but an increase in armature speed and voltage reduces the voltage drop in the resistance and so strengthens the motor field, thereby limiting the speed of the motor. Continuing the movement of switch E in the same direction, the point of connection of the armature to resistance G is gradually shifted to the right, as viewed in Fig. 4, so as to increase the voltage impressed on the armature, and consequently its speed, without greatly changing the current in the field winding C. With the point of connection of the armature with the resistance G at the extreme right end of said resistance, the motor operates as a pure shunt motor.

It will be noted that the control above described requires only a small number of leads. The armature A, field winding C and resistance G may be permanently connected in series. For hoisting, the three are connected in series relation to the source, while for lowering, as shown in Fig. 4, the field winding C and resistance G are connected in series with the source, while the free terminal of armature A is connected to a point on the resistance, or, in other words, the armature is connected in a circuit which is in parallel with a circuit containing the field winding C and a resistance. If, after starting the load of the hoist downward, the controller is returned to the off position, the parallel circuits are disconnected from the supply mains F, whereby the windings of the motor are left connected in a local or dynamic braking circuit.

What I claim as new, and desire to secure by Letters Patent of the United States, is—

1. In combination, an electric motor, a resistance, and means for connecting the armature and field of said motor and said resistance in series to the source for operation in one direction and for connecting the field winding and said resistance in series to the source and the armature in shunt to said field winding and more or less of said resistance for operation in the other direction.

2. In combination, an electric motor, a resistance, the armature and field winding of the motor and resistance being permanently connected in series, a source of current, and means for connecting the armature, field winding and resistance in series to said source for operation in one direction and for connecting the field winding and said resistance in series to the source and connecting the free terminal of the armature to different points on said resistance for operation in the opposite direction.

3. In combination, an electric motor, a resistance, a source of current, and means for connecting the field winding of said motor and said resistance in series to the source and the armature in shunt to said field winding and more or less of said resistance.

4. In combination, an electric motor, a resistance, the armature and field winding of the motor and the said resistance being permanently connected in series, a source of current, and means for connecting the field winding and said resistance in series to the source and connecting the free terminal of the armature to different points on said resistance.

5. In combination with an electric motor, means for connecting a field winding of the motor in series with the armature for operation in one direction, for connecting the field winding of the motor in series with a resistance and in parallel with the armature for operation in the opposite direction, and for connecting said field winding and armature in a local or dynamic braking circuit.

6. In combination with an electric motor, a source of current, means for connecting said motor to the source for operation in one direction with a field winding in series with the armature, for connecting the field winding of the motor in series with a resistance and in parallel with the armature across said source for operation in the opposite direction, and for disconnecting the motor from the source and connecting the armature and said field winding in a local or dynamic braking circuit.

7. In combination with an electric motor, a source of current, a reversing switch arranged in one position to connect the motor to the source with the armature in series with a field winding, and in another position to connect the motor to the source with the field winding in series with a resistance across the source and in parallel with the armature, and in a third position to disconnect the motor from the source and to connect the armature and said field winding in a local or dynamic braking circuit.

8. In combination, an electric motor having its armature winding and a field winding permanently connected in series, a source of current, a resistance, and means for connecting said windings in series with said resistance to the source for operation in one direction, and for connecting said field winding and said resistance in series to the source and connecting the free terminal of the armature to a point on said resistance for operation in the opposite direction.

9. In combination, an electric motor having its armature winding and a field winding permanently connected in series, a source of current, a resistance, means for connecting said windings in series with said resistance to the source for operation in one direction, and for connecting said field winding and said resistance in series to the source and connecting the free terminal of the armature to a point on said resistance for operation in the opposite direction, and means for varying the amount of said resistance in circuit.

10. In combination with an electric motor, a reversing switch therefor arranged to connect the field winding of the motor in series with the armature, to connect the field winding in series with a resistance and in parallel with the armature, and to connect the armature to said field winding in a local or dynamic braking circuit.

11. In a control system for electric hoists, an electric motor, a controller so arranged that in lowering the load the field winding of the motor will be connected in a circuit containing a resistance and the armature of the motor will be connected in a parallel circuit with said field winding and resistance, thereby starting the load downward, and means for disconnecting the parallel circuits from a supply main, thereby leaving the windings of the motor connected in a local or dynamic braking circuit.

12. In combination, an electric motor, the armature and field winding of said motor being permanently connected in series, a source of current, and means for connecting the armature, field winding and a resistance in series to said source for operation in one direction and for connecting the field winding and a resistance in series to the source and the armature in a parallel circuit for operation in the opposite direction.

13. In combination, an electric motor, the armature and field winding of said motor being permanently connected in series, a source of current, and means for connecting the armature, field winding and a resistance in series to said source for operation in one direction and for connecting the field winding and a resistance in series to the source and the armature in a parallel circuit for operation in the opposite direction, and for disconnecting said source, thereby leaving the windings of the motor connected in a local or dynamic braking circuit.

14. In combination, an electric motor, a resistance, the armature and field winding of the motor being permanently connected in series, a source of current, and means for connecting the armature, field winding and resistance in series to said source for operation in one direction and for connecting the field winding and said resistance to the source and connecting the free terminal of the armature to different points on said resistance for operation in the opposite direction.

15. In combination, an electric motor, a resistance, the armature and field winding of the motor being permanently connected in series, and means for connecting the armature and field of said motor and said resistance in series to the source for operation in one direction and for connecting the field winding and said resistance in series to the source and the armature in shunt to said field winding and more or less of said resistance for operation in the other direction.

16. In combination, an electric motor, a resistance, the armature and field winding of the motor being permanently connected in series, a source of current, and means for connecting the field winding and said resistance in series to the source and connecting the free terminal of the armature to different points on said resistance.

17. In a control system for electric motors, an electric motor having a series field winding, and a controller, which, when operated to cause the load to be lowered, first connects the armature and the field winding of the motor in parallel paths, the parallel path containing the field winding also containing a resistance, and connects said parallel paths across the supply mains, and subsequently disconnects said parallel paths from the supply mains, leaving the armature and field windings of the motor connected in a local or dynamic braking circuit.

18. In a control system for electric hoists, an electric motor having a series field winding, a resistance for said motor, and a controller having means which, when operated to cause the load to be lowered, first connects the armature and field windings of the motor in parallel paths and connects said parallel paths across the supply mains with the resistance in series therewith and leaves the armature and field windings of the motor in a local or dynamic braking circuit.

19. In a control system for electric hoists, an electric motor having a series field winding, a controller having stationary contacts and a movable member having contacts cooperating therewith, and resistance sections connected to certain of said stationary contacts, the arrangement being such that when the movable member of the controller is moved in one direction from the off-position, the motor and series field winding are connected in series across the supply mains and in series with a resistance in such a manner as to cause the motor to hoist the load, further motion of said movable member of the controller reducing said resistance and, when the movable member is moved in the opposite direction from the off-position the armature and field windings of the motor are connected in parallel circuits across the supply mains, the parallel circuit containing the field winding also containing a resistance section, the connection being such as to cause the motor to drive the load downward, the motion of the movable member of the controller toward the off-position then disconnecting said parallel circuits from the supply mains and leaving the windings of the motor connected in a local or dynamic braking circuit.

20. In a control system for electric motors, a closed circuit containing the armature, a field winding and a resistance, and means for connecting said closed circuit to the line so as to form two parallel circuits, one containing the armature and the other the field winding in series with a resistance.

21. In a control system for electric motors, a closed circuit containing the armature, a field winding and a resistance, a connection to one side of the line between the armature and the field winding, and a connection from the resistance to the other side of the line.

22. In a control system, a source of current, an electric motor having a series field winding, and means for connecting the armature and field winding of said motor and a resistance in series to said source for operation in one direction, and for connecting the field winding and a resistance in series to said source and the armature in shunt to said field winding and resistance for operation in the other direction.

23. In a control system, a source of current, an electric motor having a series field winding, and means for connecting the armature and field winding of said motor and a resistance in series to said source for operation in one direction, for connecting the field winding and a resistance in series to said source and the armature in shunt to said field winding and resistance for operation in the other direction, and for disconnecting said source thereby leaving the windings of the motor connected in a local or dynamic braking circuit.

24. In a control system for electric hoists, supply mains, an electric motor having a series field winding, and a controller, which, when operated to cause the load to be hoisted, connects the armature and field winding of said motor in series with a resistance across said supply mains, and, which, when operated to cause the load to be lowered, connects the armature and the field winding of the motor in parallel paths, the parallel path containing the field winding also containing a resistance, and connects said parallel paths across said supply mains, and subsequently disconnects said parallel paths from a supply main, leaving the windings of the motor connected in a local or dynamic braking circuit.

In witness whereof I have hereunto set my hand this 18th day of May, 1908.

WILHELM NAUMANN.

Witnesses:
JULIUS RUMLAND,
OSKAR SINGER.